US010667225B2

(12) United States Patent
Hou et al.

(10) Patent No.: US 10,667,225 B2
(45) Date of Patent: May 26, 2020

(54) METHOD AND DEVICE FOR VEHICLE-TO-VEHICLE COMMUNICATION (71) Applicant: SONY CORPORATION, Tokyo (JP)

(72) Inventors: Yanzhao Hou, Beijing (CN); Qimei Cui, Beijing (CN); Shiyu Zhang, Beijing (CN); Shiwei Cao, Beijing (CN); Hui Liang, Beijing (CN); Qinyan Jiang, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/769,954

(22) PCT Filed: Oct. 25, 2016

(86) PCT No.: PCT/CN2016/103182
§ 371 (c)(1),
(2) Date: Apr. 20, 2018

(87) PCT Pub. No.: WO2017/076190
PCT Pub. Date: May 11, 2017

(65) Prior Publication Data
US 2018/0324729 A1 Nov. 8, 2018

(30) Foreign Application Priority Data
Nov. 5, 2015 (CN) .......................... 2015 1 0747096

(51) Int. Cl.
*H04W 56/00* (2009.01)
*H04L 29/08* (2006.01)
(Continued)

(52) U.S. Cl.
CPC ......... *H04W 56/0015* (2013.01); *H04L 29/08* (2013.01); *H04W 4/40* (2018.02); *H04W 72/042* (2013.01); *H04W 72/10* (2013.01)

(58) Field of Classification Search
CPC .......... H04L 29/08; H04W 4/04; H04W 4/40; H04W 56/0015; H04W 72/042; H04W 72/10
See application file for complete search history.

(56) References Cited

U.S. PATENT DOCUMENTS 9,129,532 B2     9/2015  Rubin et al.
2013/0279393 A1* 10/2013  Rubin ................... H04J 3/1694
                                                370/312
(Continued)

FOREIGN PATENT DOCUMENTS

CN     102917372 A     2/2013
EP       2159127 A2    3/2010
(Continued)

OTHER PUBLICATIONS

International Search Report dated Jan. 16, 2017 in PCT/CN2016/103182 filed Oct. 25, 2016.
(Continued)

*Primary Examiner* — Jianye Wu
(74) *Attorney, Agent, or Firm* — Xsensus LLP (57) ABSTRACT A device and method for vehicle-to-vehicle communication. The method includes: a source device sends a request message to a base station, the request message being used for requesting the base station to allocating a resource; a node device that is synchronous with the source device sends synchronous information to at least one target device, so that the at least one target device establishes time synchronization with the source device according to the synchronous information, wherein the node device is a roadside device or an in-car device capable of communicating; the source device informs the at least one target device of a
(Continued)

resource allocated by the base station; and the source device sends service information to the at least one target device by utilizing the resource.

21 Claims, 6 Drawing Sheets

(51) Int. Cl.
  *H04W 4/40* (2018.01)
  *H04W 72/04* (2009.01)
  *H04W 72/10* (2009.01)

(56) References Cited

U.S. PATENT DOCUMENTS

| | | | |
|---|---|---|---|
| 2015/0112545 A1* | 4/2015 | Binion | B60R 21/00 |
| | | | 701/33.4 |
| 2015/0195827 A1 | 7/2015 | Feng et al. | |
| 2015/0326668 A1 | 11/2015 | Maeder et al. | |
| 2018/0139714 A1* | 5/2018 | Li | H04W 56/0015 |

FOREIGN PATENT DOCUMENTS

| | | |
|---|---|---|
| WO | WO 2014/005629 A1 | 1/2014 |
| WO | WO 2014/012244 A1 | 1/2014 |

OTHER PUBLICATIONS

European extended Search Report dated Oct. 10, 2018, issued in corresponding European Application No. 16861458.

* cited by examiner

FIG. 1 vehicle managed by base station A vehicle managed by base station B

METHOD AND DEVICE FOR VEHICLE-TO-VEHICLE COMMUNICATION

FIELD

The present disclosure relates to a method and a device for vehicle-to-vehicle (V2V) communication, and in particular to a method and a device capable of transmitting road safety information quickly and reliably.

BACKGROUND

Recently, V2V communication, which is mainly used for exchanging road safety-related information among vehicles, has been rapidly developed. For example, a vehicle can inform another vehicle of its own speed, position, driving direction, braking condition and the like. Therefore, a driver can be notified in advance through the V2V communication, for example, by receiving warning information indicating that a distance between vehicles is too small or there is an accident ahead, such that the driver may have enough time to take actions, thereby reducing occurrence of accidents.

Due to the characteristic of the V2V communication, there is a high demand for rapid transmission of road safety information. Therefore, a method for exchanging information among vehicles rapidly and reliably is required.

SUMMARY

In an aspect of the present disclosure, a device for vehicle-to-vehicle communication is provided, which includes one or more processors configured to: perform control, in response to road event-related information from a source device, to establish time synchronization with the source device; and generate synchronization information for transmission to one or more target devices, so that the target devices establish time synchronization with the source device based on the synchronization information, wherein the node device is a roadside unit or an onboard device capable of communication.

In another aspect of the present disclosure, a method for performing synchronization in a vehicle-to-vehicle communication system is provided, which includes: establishing, by a node device, time synchronization with a source device, in response to road event-related information from the source device; transmitting, by the node device, synchronization information to one or more target devices; and establishing, by the target devices, time synchronization with the source device based on the received synchronization information, wherein the node device is a roadside unit or an onboard device capable of communication.

In another aspect of the present disclosure, a device for vehicle-to-vehicle communication is provided, which includes one or more processors configured to: generate a request message for requesting a base station to allocate a resource; perform control to establish time synchronization with a node device, such that at least one target devices establish time synchronization with the device based on synchronization information transmitted by the node device, wherein the node device is a roadside unit or an onboard device capable of communication; generate a control message for informing the at least one target devices of the resource allocated by the base station; and generate service information related to a service for transmission to the at least one target devices via the resource allocated by the base station.

In another aspect of the present disclosure, a method for transmitting service information in a vehicle-to-vehicle communication system, which includes: transmitting, by a source device, a request message to a base station, wherein the request message is used for requesting the base station to allocate a resource; transmitting, by a node device in synchronization with the source device, synchronization information to at least one target devices, such that the at least one target devices establish time synchronization with the source device based on the synchronization information, wherein the node device is a roadside unit or an onboard device capable of communication; informing, by the source device, the at least one target devices of the resource allocated by the base station; and transmitting, by the source device, the service information to the at least one target devices by using the resource.

In another aspect of the present disclosure, a method for transmitting service information in a vehicle-to-vehicle communication system is provided. The vehicle-to-vehicle communication system includes multiple base stations, a controller for controlling the multiple base stations, a source device, and at least one target devices. The method includes: acquiring, by the controller, location information and service information of the source device from a serving base station of the source device; transmitting, by the controller, the service information to all neighbor base stations within a predetermined range around the source device; and broadcasting, by each of the neighbor base stations, the service information to the target device within its coverage.

BRIEF DESCRIPTION OF THE DRAWINGS

The disclosure may be better understood with reference to the detailed description given below in conjunction with the accompanying drawings. Identical or like reference signs denote identical or like components throughout the accompanying drawings. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
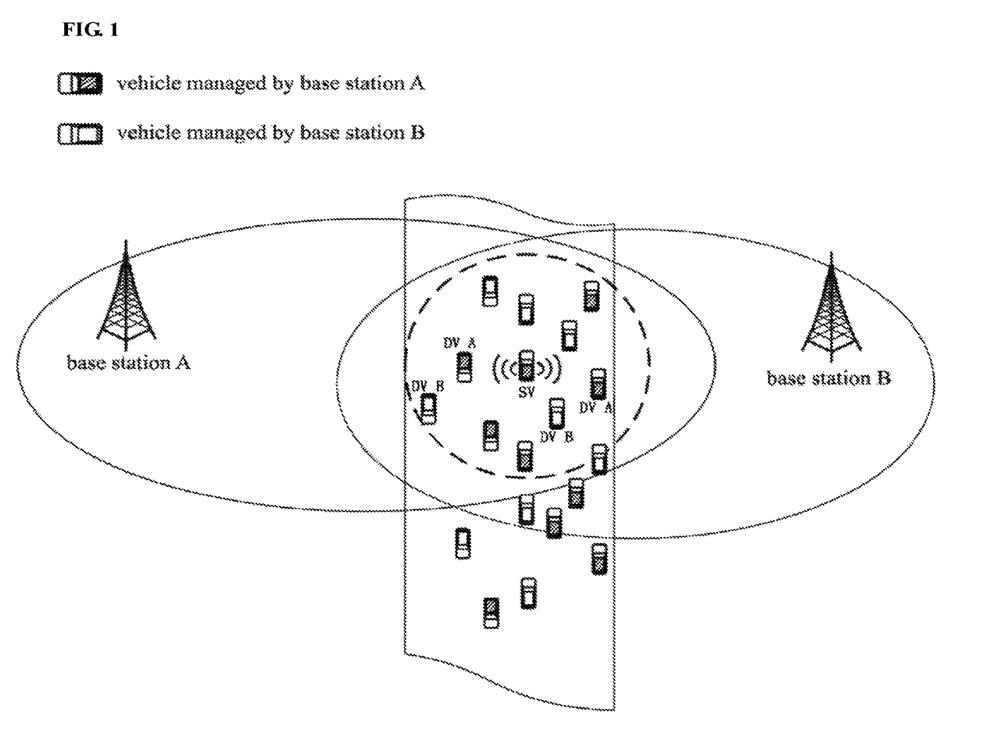
FIG. 1 shows a scenario of LTE-based V2V communication.

FIG. 1 shows a general scenario of LTE-based V2V communication. As shown in FIG. 1, it is assumed that a road accident, for example, a breakdown or a collision accident occurs to the source vehicle SV, around which there are a number of other vehicles (hereinafter referred to as target vehicles DV) traveling. In this case, it is necessary to rapidly transmit road safety information related to the road accident occurred to the source vehicle SV to the target vehicles DV in the vicinity, so that drivers of the target vehicles DV can take actions in time, such as braking or avoiding the source vehicle SV.

Specifically, in a practical scenario, communication terminals carried by the source vehicle SV and the target vehicle DV are likely to be registered with different operators. For example, as shown in FIG. 1, vehicle terminals of a source vehicle SV and target vehicles DV A are registered with operator A, and vehicle terminals of target vehicles DV B are registered with operator B. FIG. 1 also shows two base stations A, B which are managed by the operators A and B, respectively. The vehicles may be within both the coverage of the base station A and the coverage of the base station B simultaneously.

Figure 2:
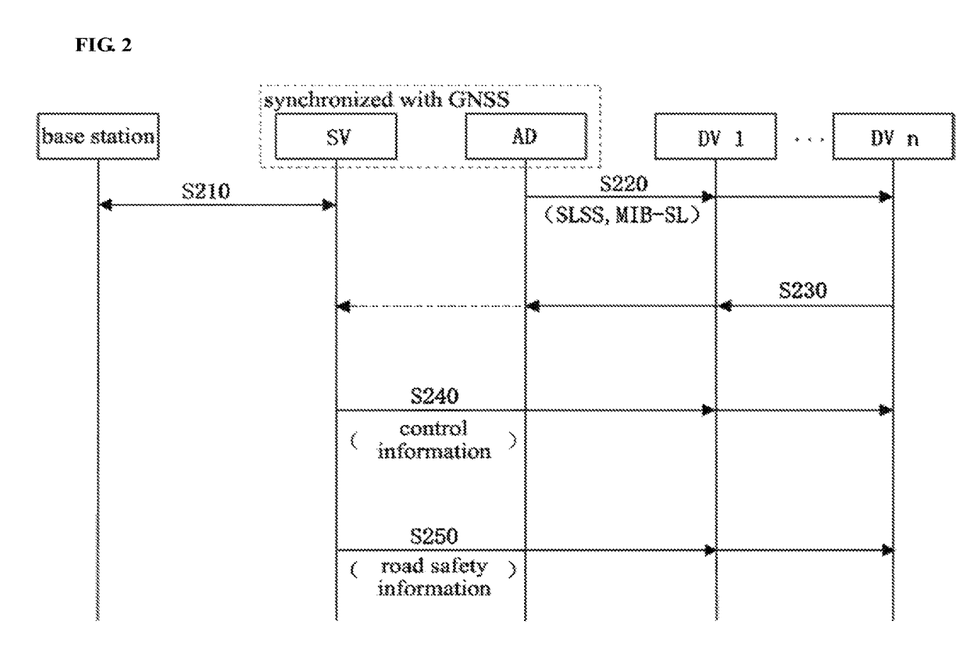
FIG. 2 is a signal flow chart of transmission of road safety information according to a first embodiment of the present disclosure.

FIG. 2 shows a signal flow chart of transmission of road safety information according to a first embodiment. As shown in FIG. 2, the process includes four steps, each of which are described in detail below.

In a first step, after a road safety event occurs, the terminal of the source vehicle SV generates road safety information and acquires a transmission resource for transmitting the road safety information from a serving base station of the source vehicle SV, as shown by step S210, which is described in detail below with reference to FIG. 5.

In a second step, the auxiliary node device AD synchronized with the source vehicle SV transmits synchronization information to terminals of multiple target vehicles DV1 to DVn in step S220. In addition, in step S230, the terminals of the target vehicles DV1 to DVn establish time synchronization with the auxiliary node device AD based on the synchronization information, thereby establishing synchronization with the terminal of the source device SV (as indicated by the dotted line). For example, the auxiliary node device AD may be a roadside unit (RSU) or a vehicle terminal. The roadside unit is a device capable of communication, and for example may be independently deployed on any side of a road or installed together with a signal light. The vehicle can perform communication with the roadside unit when entering a communication range of the roadside unit. For example, the roadside unit may include a device that functions like a base station and a device that functions like a terminal. The roadside unit may be fixed or mobile.

In this present embodiment, the terminal of the auxiliary node device AD and the terminal of the source vehicle SV are registered with different operators, while the terminal of the auxiliary node device AD and the terminals of the target vehicles DV1 to DVn are registered with the same operator. In this case, the auxiliary node device AD may be in synchronization with the terminal of the source device SV according to a global synchronization signal source, which may include for example global navigation satellite system (GNSS) or a synchronization signal source equivalent to GNSS, or may be a GNSS-based reference synchronization signal source provided by a base station, and the present disclosure is not limited thereto. Therefore, as shown in FIG. 2, the synchronization can be established between the terminals of the source vehicle SV and the target vehicles DV1 to DVn registered with different operators via the auxiliary node device AD, thereby facilitating transmission of the road safety information.

It should be noted that the execution sequence of the first step and the second step is not limited to the above-mentioned. Instead, the first step and the second step may be performed simultaneously or in an order reverse to the above order depending on actual situation. For example, it is shown in FIG. 2 that step S210 is performed after step S220. The execution sequence of these two steps is not limited in the present disclosure.

In an example, a communication resource for transmitting synchronization information may be indicated to the terminals of the auxiliary node device AD and the target vehicle DV in advance. For example, in a case where the auxiliary node device AD is a terminal of a certain vehicle, a resource for transmitting synchronization information may be indicated to the terminal of the vehicle and the terminal of the target vehicle DV in the system information block SIB 18 transmitted by the base station. Therefore, the terminals of the target vehicles DV1 to DVn can monitor the resource to detect the synchronization information, and establish synchronization based on the synchronization information.

The synchronization information may include a sidelink synchronization signal (SLSS) and a master information block-sidelink (MIB-SL). According to the conventional device to device (D2D) communication technology, SLSS and MIB-SL are transmitted with a fixed periodicity of 40 ms, and the occupied subframe is indicated by a parameter syncOffsetIndicator which is expressed as follows:

(10*DFN+subframe number)mod 40=syncOffsetIndicator, where DFN is DirectFrame Number.

Considering sensitivity of the V2V communication to time delay, the transmission period of SLSS and MIB-SL is shortened, for example, to 20 ms or less in the present disclosure. Specifically, the auxiliary node device AD may be configured, by a serving base station of the auxiliary node device AD, with a relatively short transmission period for SLSS and MIB-SL, which is the shortest period that can be used by the auxiliary node device AD for transmitting SLSS and MIB-SL. Specifically, in a case where the auxiliary node device AD is a roadside unit, the shortest period may be set for the auxiliary node device AD in advance. In this case, the auxiliary node device AD may determine a priority of the occurred road event based on road event-related information from the source vehicle SV, and transmit SLSS and MIB-SL with an appropriate periodicity which is selected in a range greater than or equal to the shortest period based on the priority. For example, for a low-priority event, synchronization information is still transmitted with a periodicity of 40 ms, and for a high-priority event, a periodicity of 20 ms is used. Therefore, the parameter syncOffsetIndicator may be expressed as follows:

(10*DFN+subframe number)mod Factor_priority=syncOffsetIndicator, where Factor_priority may take a value of 40 (for a low-priority event), 20 (for a high-priority event), or 10 (for emergency), and the like for different road events.

In addition, in an example, the synchronization signal may be transmitted through dedicated signaling. For example, the identifier of the synchronization signal SSLS ID may be limited to a part of 167 IDs in the conventional D2D communication for distinguishing the synchronization signal for the V2V communication from the synchronization signal for the conventional D2D communication. In addition, in the conventional D2D communication, it is required that a transmitter notifies a receiver of information such as a network type (time division duplex or frequency division duplex) and a cyclic prefix type (a normal or extended cyclic prefix) of a synchronization signal in each transmission. In the present disclosure, the network type and/or the cyclic prefix type of the synchronization signal may be prescribed. With the specific signaling as prescribed above, complexity in blind detection of the synchronization signal by the terminal of the target vehicle DV can be reduced.

In a third step, the source vehicle SV transmits control information to the multiple target vehicles DV1 to DVn, as shown in step S240. The control information includes resource information for transmitting the road safety information, a physical layer identifier (ID), a modulation and coding scheme, time calibration and the like. The resource for transmitting the control information may be indicated in the MIB-SL transmitted in the second step described above.

In a fourth step, the terminal of the source vehicle SV broadcasts the road safety information to the multiple target vehicles DV1, DV2, DVn by using the transmission resource acquired from the base station, as shown in step S250.

Since the objects to which the road safety information is broadcasted are not fixed and are usually in great numbers, states of communication channels between the source vehicle SV and the multiple target vehicles DV are uncertain each time the road safety information is broadcasted. However, high reliability is required in transmission of the road safety information. In this case, the terminals of the source vehicle SV and the target vehicles DV may operate in a fixed manner with respect to the physical layer operation for the road safety information. In an example, the modulation and coding scheme for the road safety information may be prescribed in advance. Therefore, it is unnecessary for the source vehicle SV to additionally notify the target vehicles DV of the modulation and coding scheme at each broadcast, thereby facilitating fast demodulation/decoding of the road safety information by the terminals of the target vehicles DV and saving overhead of control information. In this example, the control information transmitted in the above third step may not include the modulation and coding scheme.

Figure 3:
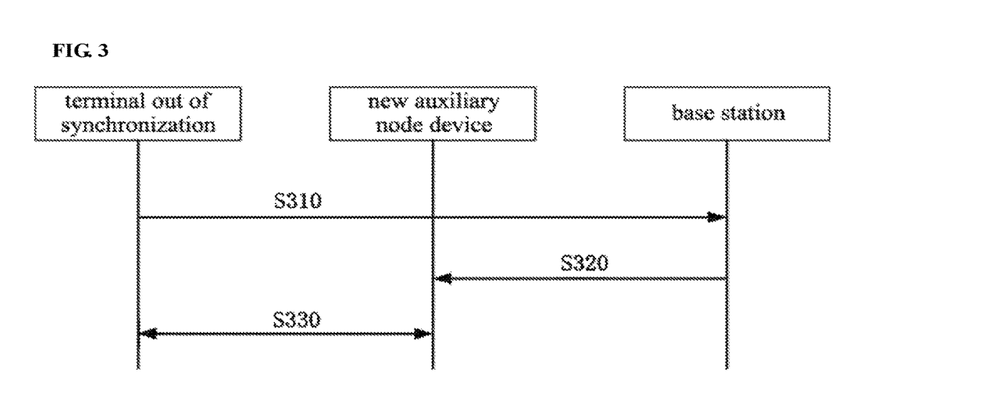
FIG. 3 is a signal flow chart of a process when a terminal of a target vehicle is out of synchronization.

The process where the terminal of the target vehicle DV is out of synchronization with the terminal of the auxiliary node device AD or the terminal of the source vehicle SV is described below with reference to FIG. 3. As shown in FIG. 3, the terminal of the target vehicle DV being out of synchronization transmits a synchronization request to a serving base station of the terminal of the target vehicle DV in step S310. The synchronization request includes location information of the terminal being out of synchronization.

The base station selects, based on the location information, another auxiliary node device AD which is adjacent to the terminal being out of synchronization and is in synchronization with the terminal of the source vehicle SV, and instructs the new auxiliary node device AD to act as a synchronization source to transmit the synchronization information to the vehicle being out of synchronization, as shown in step S320. The resource for transmitting the synchronization information are indicated to the terminal being out of synchronization and the selected auxiliary node device AD by the base station through SIB Next, the vehicle being out of synchronization monitors the resource which is used for transmitting the synchronization information and is prescribed by the SIB 18 in step S330, and re-establishes synchronization on detection of the synchronization information from the auxiliary node device AD.

Figure 4:
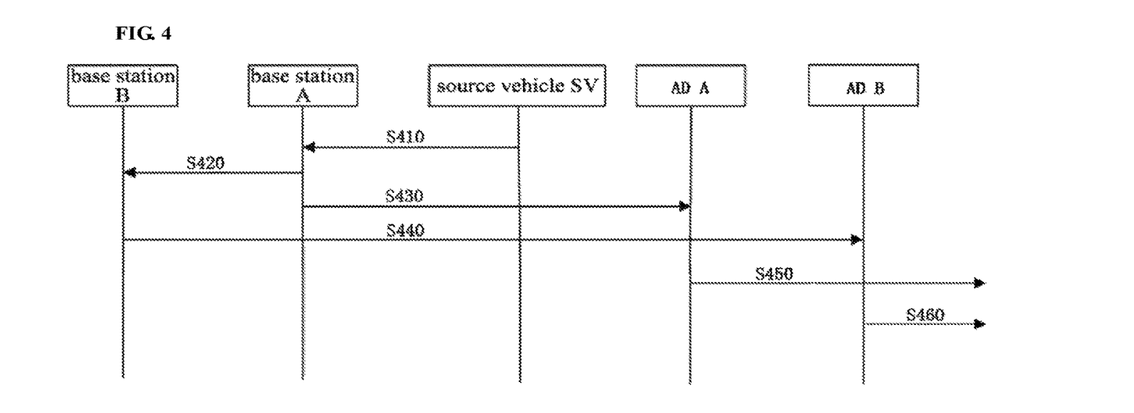
FIG. 4 is a signal flow chart of a process of configuring an auxiliary node device.

The method for configuring the auxiliary node device AD is described below with reference to FIG. 4. As shown in FIG. 4, after a road event occurs to the source vehicle SV, the source vehicle SV requests the serving base station A of the source device SV to allocate a communication resource and reports its own location information and road event-related information (such as priority of the road event) in step S410. Upon receiving the request along with the related information, the base station A responds to the source vehicle SV (which is described below in conjunction with FIG. 5) and notifies neighbor base stations of the position information of the source vehicle SC and the road event-related information in step S420. The neighbor base stations may include base stations belonging to another operator (only base station B is schematically shown in FIG. 5). Then, each of the base station A and a neighbor base station (such as the base station B) randomly or uniformly selects, in its coverage, a roadside unit or vehicle terminal synchronized with the global synchronization signal source (that is, synchronized with the source vehicle SV) and registered with the same operator as the base station A or the neighbor base station, and then instructs the roadside unit or vehicle terminal to act as an auxiliary node device (shown as auxiliary node devices ADA and ADB in FIG. 4) to transmit synchronization information, as shown in steps S430 and S440. In addition, the base station A and the base station B transmit the road event-related information to the selected auxiliary node devices ADA and ADB. Alternatively, the base station A and the base station B may select specific roadside units or vehicle terminals as the auxiliary node devices ADA and ADB within the broadcast range of the source vehicle SV. Subsequently, the selected auxiliary node devices ADA and ADB transmit the synchronization information in steps S450 and S460, respectively. In this way, since there are a number of auxiliary node devices registered with different operators, a terminal of any target vehicle can quickly establish synchronization based on the synchronization information from an auxiliary node device which is registered with the same operator.

In the V2V communication, it is required that the road safety information is quickly notified from the source vehicle SV to target vehicles DV in the vicinity. Therefore, it is particularly important for the source vehicle SV to quickly obtain a resource for broadcast. The process where the communication terminal of the source vehicle SV acquires the resource for transmitting the road safety information from the serving base station of the communication terminal of the source vehicle SV is described below with reference to FIG. 5.

In the LTE-based V2V communication, a counterpart in communication with a vehicle communication terminal includes base station and another vehicle terminal, and services of the vehicle communication terminal include conventional cellular service and short-range service which requires communication with another vehicle. The short-range service generally includes a low-priority short-range service, such as normal D2D service which generally has a priority lower than that of a cellular service, and a high-priority short-range service such as the road safety event described above. As to different types of services, the base station allocates communication resource for the vehicle communication terminal in different ways.

In a case where a road event (a high-priority short-range service) occurs, if the communication terminal of the source vehicle SV is in a RRC_IDLE state, the terminal of the source vehicle SV requests the base station for a resource for transmitting the road safety information through a random access procedure. The random access procedure is known to those skilled in the art, and is not described here.

If the communication terminal of the source vehicle SV is in a RRC_CONNECTED state, the process of requesting resources further depends on whether the terminal has an uplink shared channel (UL-SCH) resource. A case where the terminal of the source vehicle SV does not have the UL-SCH resource is first described as following.

Figure 5:
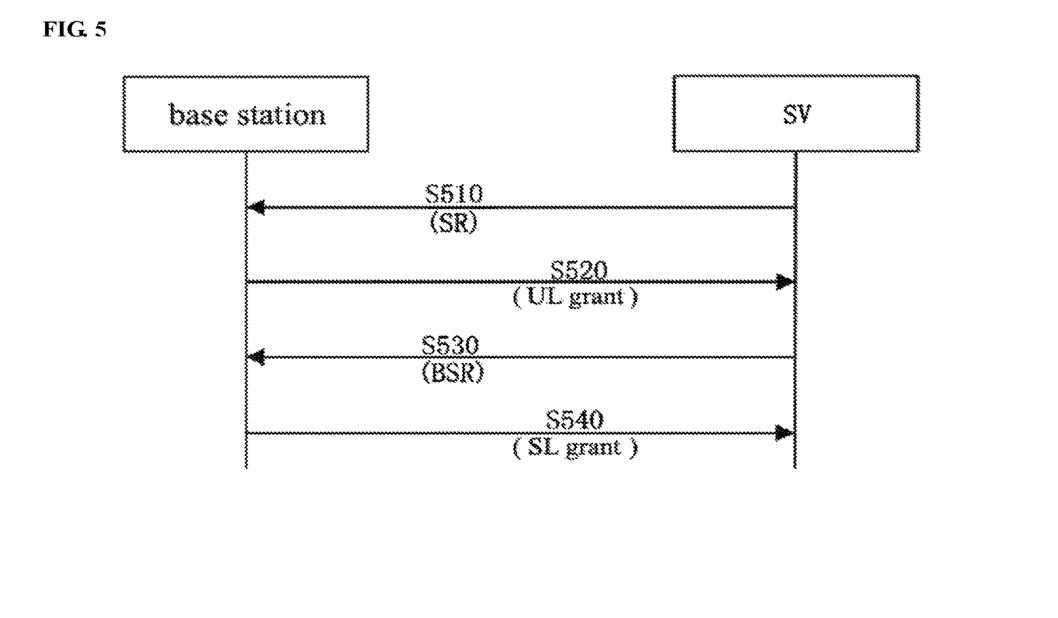
FIG. 5 is a signal flow chart of a process of acquiring a transmission resource.

In this case, as shown in FIG. 5, the terminal of the source vehicle SV waits for the next scheduling request (SR) period to apply for communication resource by reporting the SR, as shown in step S510.

Specifically, since the traditional period for SR report may be as long as 40 ms or even 80 ms, and the period for SR report of the terminal would be very long as the terminals will be densely distributed in the future, it is necessary to take a time delay from generation of a high priority short-range service to the report of SR into consideration. Assuming that the time delay is ΔT, and the maximum time delay allowed by the generated high-priority short-range service is T, the terminal of the source vehicle SV waits for the next period to report SR as described above only in a case where ΔT<T. While in a case where ΔT>T, the communication terminal of the source vehicle SV applies for a resource for transmitting the road safety information through random access procedure.

In addition, it should be noted that, maximum allowable time delays T may be set in advance for different high-priority short-range services. For example, the maximum allowable time delay T may be set to be the time required to acquire a resource through the random access procedure.

In the conventional technology, a specific counter is set for reporting the SR. Only in a case where the number of times for which the SR is reported exceeds a predetermined number, the random access procedure is performed. Otherwise, the terminal continues to wait for the next period to report the SR. The disadvantage of this mechanism when it is applied to a cellular service and a low-priority short-range service is not apparent. However, when this mechanism is applied to the high-priority short-range service, it is often difficult to meet the requirement on the time delay. For application to the high-priority short-range service, a solution is possible, in which the vehicle terminal is directly configured with a period shorter than the conventional period for SR report. However, this solution has the following disadvantages: if the vehicle terminal handles only low-priority short-range services (of which the priority is lower than that of a cellular service), configuring a shorter period for SR report may lead to occupation of communication resource, and thus the cellular service may be affected. In order to solve the problem, the present technology adopts a new SR reporting mechanism, which is described in detail below with reference to FIG. 6.

Figure 6:
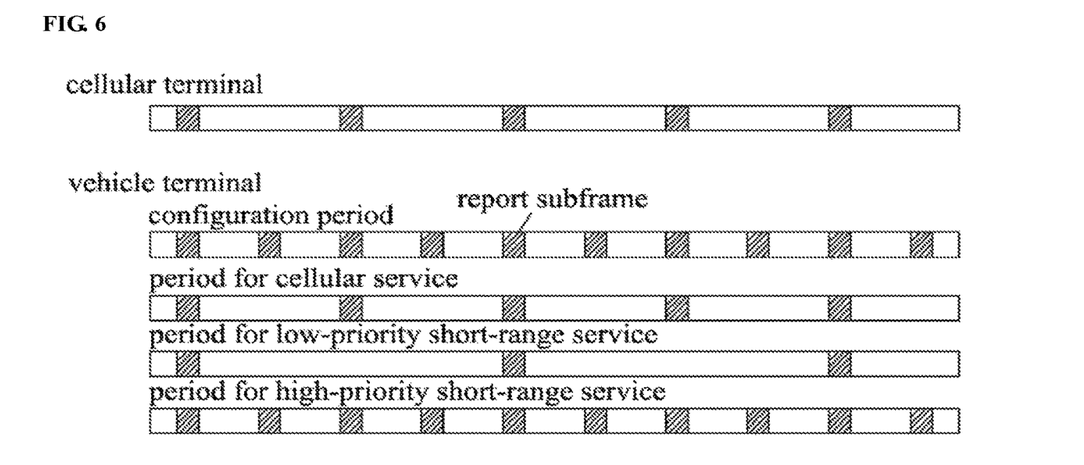
FIG. 6 schematically shows determination of a period for reporting a scheduling request based on priorities of services.

When the terminal of the source vehicle SV initially accesses to the base station, the base station may determine that the terminal is a vehicle terminal through authentication. Therefore, the base station may configure for the terminal of the source vehicle SV a short period for SR report, for example, a period which is a half of the period for SR report of a common cellular terminal. During processing, the terminal of the source vehicle SV first identifies on the MAC layer whether the service to be processed is a cellular service, a low-priority short-range service, or a high-priority short-range service, and then autonomously selects appropriate period for SR report for different services. As shown in FIG. 6, for the cellular service, the vehicle terminal uses the same period for SR report as that of the common cellular terminal. The period used for the low-priority short-range service is 2 times that of the cellular service, and a report period configured by the base station, which is a half of the period of the cellular service for example, is used for the high priority short range service. It should be noted that the period configured by the base station is the shortest period that can be used by the terminal of the source vehicle SV for reporting the SR, that is, the terminal of the source vehicle SV may report the SR with an appropriate periodicity which is selected in a range greater than or equal to the shortest period based on the type of service, which is expressed by the following equation:

$$(10 * n_f + \lfloor n_s/2 \rfloor - N_{OFFSET,SR}) \bmod (SR_{PERIODICITY} * Service_{priority}) = 0,$$

where $n_f$ is system frame number, $\lfloor n_s/2 \rfloor$ indicates the number of subframe for transmitting the SR, $N_{OFFSET,SR}$ indicates subframe offset, $SR_{PERIODICITY}$ indicates the available shortest period configured by the base station, and $Service_{priority}$ is a parameter indicating priority of service and may take a value of 1, 2, or 3 for example. A higher priority may be indicated by a smaller value of $Service_{priority}$.

With the above mechanism, the base station can easily determine a type of a service of the vehicle terminal based on the period for SR report, so as to allocate a resource for the high-priority short-range service in time and configure a longer period for SR report for the low-priority short-range service, to reduce the influence of competition for resources between the low-priority short-range service and the cellular service.

Referring back to FIG. 5, the base station transmits an uplink grant (UL grant) to the vehicle terminal in response to a scheduling request from the terminal of the source vehicle SV in step S520, where a communication resource for reporting sidelink buffer status report (SL BSR) by the terminal of the source vehicle SV is indicated in the uplink grant. The SL BSR is described in detail below.

As described above, the services of the communication terminal of the vehicle include cellular service and short-range service, both of which involve the scheduling request step (S510) and the UL grant configuration step (S520) described above. In an example of the present disclosure, the base station may simultaneously allocate a resource for reporting the SL BSR and a resource for broadcasting the road safety information to the terminal of the source vehicle SV with the UL grant in step S520, regardless of whether the terminal of the source vehicle SV performs a high-priority short-range service or a cellular service. In this way, in a case where the terminal of the source vehicle SV performs a high-priority short-range service (such as broadcast service for road safety information), the process may reduce at least a time period of 4*ms* for acquiring a resource for broadcasting the road safety information, thereby reducing the time delay in applying for resources. In response to the UL grant, the terminal of the source vehicle SV may transmit SL BSR in specific format (for example, with padded bits) in step S530 to indicate that the terminal has the broadcast service for road safety information and uses the allocated resource for broadcast. On the contrary, if the terminal of the source vehicle SV does not perform the high-priority short-range service, the terminal reports a normal SL BSR in step S530, in which case the base station may release the resource for broadcast previously configured in the UL grant.

Specifically, since the above procedure occurs when the terminal is in the RRC_CONNECTED state, the base station can determine whether the terminal initiating the scheduling request (SR) is a normal cellular communication terminal or a vehicle terminal by authentication. In a case where the terminal is a vehicle terminal, the above-described special UL grant may be transmitted. While in a case where the terminal is a cellular communication terminal, the base station transmits the conventional UL grant, to reduce the influence of pre-configuration of the resource for broadcast.

Since the terminal of the source vehicle SV indicates only whether it has information to transmit and does not indicate data amount of the information to be transmitted when requesting the resource from the base station by reporting SR, the base station cannot determine the amount of the resource to be allocated for the terminal. Therefore, only the resource for further reporting the amount of information by the terminal is indicated in the UL grant. After obtaining the UL grant, the terminal further informs the base station of the amount of data to be transmitted in its buffer through SL BSR, so that the base station determines the amount of the communication resource to be allocated to the terminal, as described in step S530. SL BSR reported by the terminal generally includes a group index, a logical channel group identifier (LCG ID) and a size of the corresponding buffer.

The group index is used for distinguishing communication groups, and objects belonging to the same communication group can be identified through the group index. Generally, the group index is configured by a base station. However, in the V2V communication scenario, after the occurrence of road event, a great time delay may be caused by the base station configuring a group index for a communication group related to the road event. In addition, it is unnecessary to distinguish the receivers in the case of the broadcast of road safety information. Instead, all vehicles within the coverage of the broadcast signal can receive the road safety information. Therefore, in an example of the present disclosure, the group index in SL BSR may be prescribed, for example, may be fixedly set to "0000".

Depending on the type of the service, the terminal may set up a great number of radio bearers, each of which corresponds to a logical channel. If the terminal reports one SL BSR for each of logical channels, a large amount of signaling overhead may be generated. To avoid this, multiple logical channels are usually grouped into a logical channel group (LCG), and the terminal reports SL BSR on the basis of LCG instead of reporting SL BSR for each of the logical channels.

In the present disclosure, the road safety event is a high-priority short-range service and needs to preferentially obtain communication resource after SL BSR is reported. Therefore, the identifier LCG ID of the logical channel group corresponding to the short-range service may be set to "00", to indicate that SL BSR regarding the short-range service has a right to be reported preferentially. In contrast, the LCG ID corresponding to the low-priority short-range service is generally set to "11".

It should be noted that setting the group index to "0000" and the LCG ID to "00" as described above is only exemplary, the present disclosure is not limited to the specific values, and other values may also be used. The prescribed fixed group index and LCG ID may be used by the base station to a certain degree to identify the SL BSR related to the high-priority short-range service, so that the base station may preferentially configure communication resource for the terminal upon receiving the SL BSR.

Then, the base station transmits a grant (specifically, sidelink (SL) grant) to the vehicle terminal in response to the SL BSR reported by the terminal of the source vehicle SV in step S540, where a communication resource for broadcasting the road safety information by the terminal is indicated in the SL grant. Due to high requirement of the V2V communication on reliability, the base station should preferentially allocate a dedicated frequency band resource for communicating the road safety information if such dedicated resource exists. In addition, licensed frequency bands and shared frequency bands (for example, auxiliary authorization access LAA) for the cellular service can also be configured for the broadcast of the road safety information.

The process in a case where the terminal of the source vehicle SV does not have UL-SCH resource is described above in steps S510 to S540. The process in a case where the terminal has UL-SCH resource will be described below. In a case where the terminal of the source vehicle SV has UL-SCH resource, the process of acquiring the resource for broadcast from the base station includes only steps S530 and S540. That is, the terminal reports the SL BSR, and then the base station configures the resource for broadcast in response to the report and transmits the SL grant.

With the transmission scheme of the road safety information according to the first embodiment of the present disclosure, terminals of the multiple target vehicles DV1, DV2, DVn adjacent to the source vehicle SV can receive the road safety information correctly and timely, and thus the driver is provided with time to take action. An interruption process during transmission/reception of the road safety information by the vehicle terminal is described below.

In a case where another synchronization information is detected when the terminal of the target vehicle DV is receiving the road safety information, the terminal of the target vehicle DV determines, based on the signal quality and the periodicity of the new synchronization information, whether to continue to receive the current road safety information or to synchronize with the new synchronization source to receive new road safety information. Specifically, the terminal of the target vehicle DV first determines whether the reception quality of the new synchronization information is higher than a predetermined threshold. In a case where the reception quality of the new synchronization information is lower than the predetermined threshold, the terminal continues to receive the current road safety information. In a case where the reception quality of the new synchronization information is higher than the predetermined threshold, the terminal determines, based on the transmission period of the new synchronization information, whether a priority of a service corresponding to the new synchronization information is higher than a priority of a service corresponding to the currently received road safety information. If the service corresponding to the new synchronization information has a higher priority, the terminal stops the current reception and starts to synchronize with the new synchronization source to receive new service message. Otherwise, the terminal continues the current reception.

Figure 7:
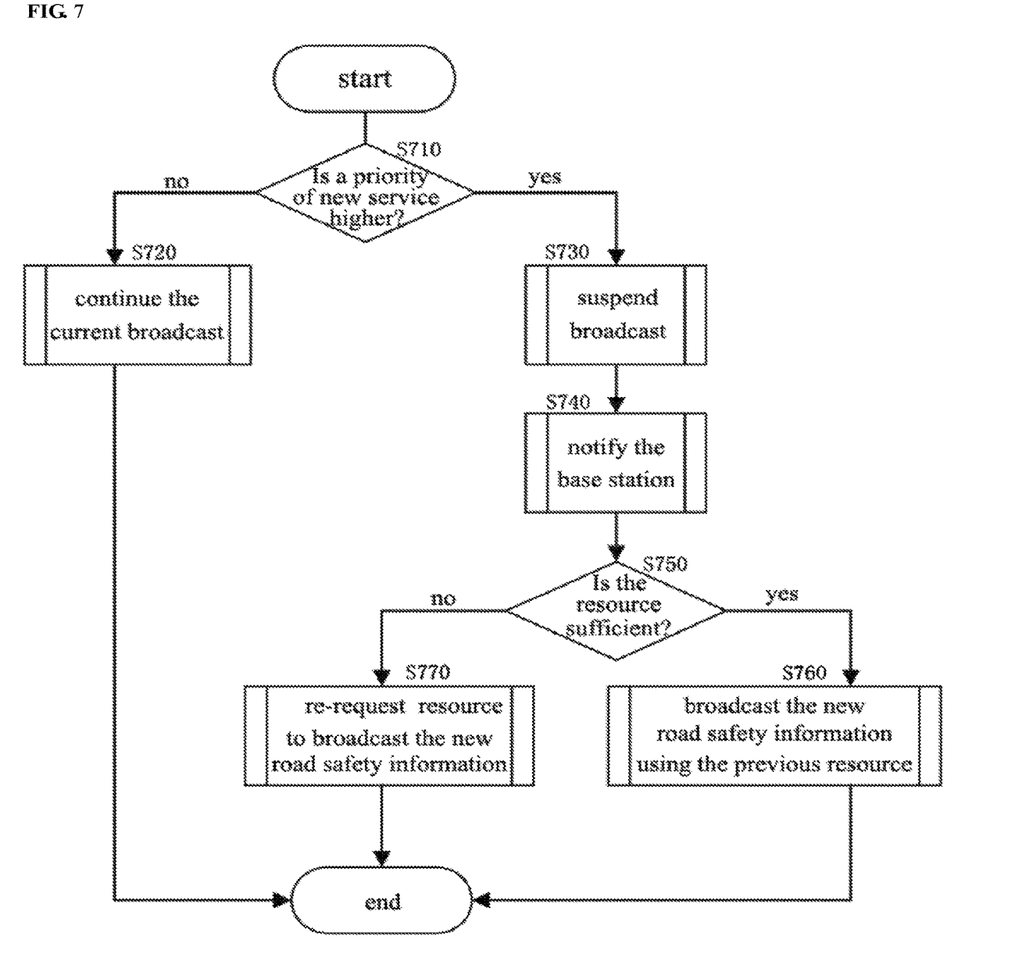
FIG. 7 is a flowchart showing an example of an interrupt process according to the present disclosure.

Further, as shown in FIG. 7, if a new service is generated when the terminal of the source vehicle SV is transmitting the road safety information, the terminal first determines in step S710 whether a priority of the new service is higher than a priority of a service corresponding to the currently transmitted road safety information. If the priority of the new service is lower, the terminal continues to broadcast the current road safety information in step S720. If the priority of the new service is higher, the terminal suspends the broadcast of the current road safety information in step S730 and notifies the base station of this fact through SL BSR in step S740. The terminal determines whether the resource previously allocated by the base station for broadcasting the current road safety information is sufficient to transmit the road safety information of the new service, as shown in step S750. If the resource is sufficient, the terminal transmits the new road safety information by using the previously configured resource in step S760 without requesting the base station to allocate resources. Otherwise, the terminal re-requests a communication resource from the base station in step S770 to transmit the new road safety information, and the base station may release the previously configured resource while reallocating resources. Optionally, after transmission of the new road safety information is finished, the base station may reallocate the previously released resource to the terminal to continue the broadcast of the original road safety information.

The transmission of the road safety information according to the second embodiment is described below with reference to FIG. 8. The second embodiment mainly differs from the first embodiment in that the road safety information is broadcast to multiple target vehicles DV by the base station instead of the source vehicle SV, so that target vehicles in a wider range can be notified through one broadcast.

Figure 8:
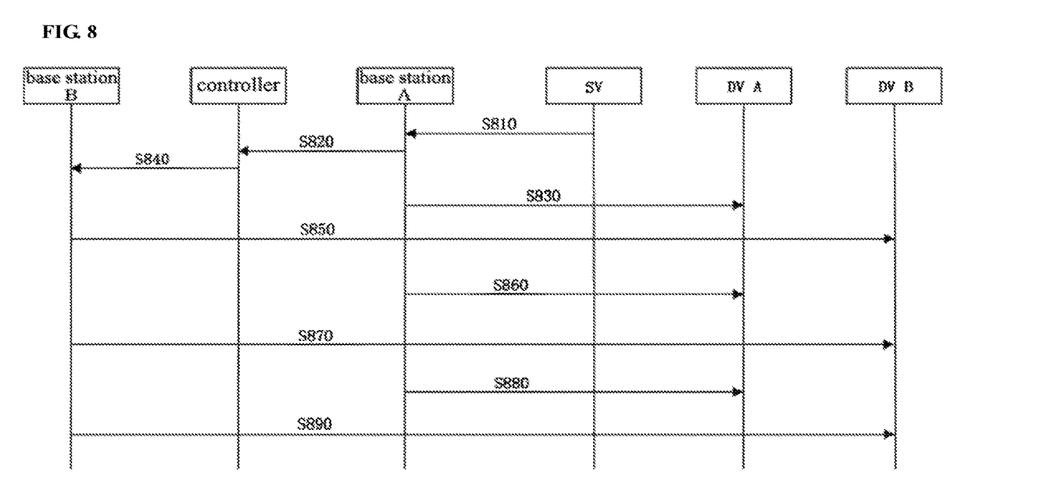
FIG. 8 is a signal flow chart of transmission of road safety information according to a second embodiment of the present disclosure.

As shown in FIG. 8, the communication system to which the second embodiment is applicable includes: a source vehicle SV, target vehicles DVA and DVB (assuming that the target vehicles DVA and DVB are managed by base stations A and B of different operators, respectively), and a controller which manages and controls the base station A and the base station B.

After a road event occurs to the source vehicle SV, the terminal of the source vehicle SV reports its location information and the generated road safety information to the base station A (herein, it is assumed that the base station A is also the serving base station of the terminal of the source vehicle SV), as shown in step S810.

The base station A reports the received road safety information and the received location information of the source vehicle SV to the controller in step S820, and broadcasts a paging message to all the vehicle terminals which are located in the coverage of the base station A and registered with the same operator as the base station A in step S830 to indicate triggering of a road safety information broadcast (FIG. 8 only schematically shows that the paging message is transmitted to the target vehicle DV A).

Then, the controller determines impact area of the road event based on the received information, and transmits the received road safety information to the base stations of respective operators within the area in step S840 (FIG. 8 only schematically shows that the received road safety information is transmitted to the base station B).

Upon receipt of the road safety information transmitted by the controller, the base station B starts the process for broadcasting the road safety information, and broadcasts a paging message to all the vehicle terminals which are located within the coverage of the base station B and registered with the same operator as the base station B in step S850 (FIG. 8 only schematically shows that the paging message is transmitted to the target vehicle DV B).

Then, in steps S860 and S870, the base station A and the base station B respectively inform the target vehicles DVA and DVB managed by the base station A and the base station B of the resources for broadcasting the road safety information. For example, the base station A and the base station B may indicate the resources by configuring SIB 18 (for example, commRxPool field), in which case the terminals of target vehicles DVA and DVB that receives the paging message may be informed of the resources for broadcasting the road safety information by monitoring SIB 18, so as to receive the road safety information on the resources.

In an example, instead of the above steps S860 and S870, the base station may also inform, with paging messages, all the terminals of the target vehicles DV in RRC_IDLE state to establish connections with the base station, and then notify these terminals of the resource for broadcasting the road safety information in unicast. This manner is more suitable for a scenario where there are fewer vehicles on the road, otherwise, a great time delay may be caused.

Finally, in steps S880 and S890, the base station A and the base station B broadcast the road safety information to the target vehicles DVA and DVB, respectively. In an example, the coverage of the base station is usually large and may be beyond the impact area of the occurred road event. In this case, in order to avoid unnecessary operations of irrelevant vehicles, the base station may include the location information of the source vehicle SV in the broadcast information, so that only vehicles within a certain distance from the source vehicle SV need to receive the road safety information.

The advantage of the scheme where the road safety information is broadcast by the base station as described in the second embodiment is apparent. The base stations of respective operators are responsible for notifying the road safety information to the vehicle terminals which are located within the impact area of the event and registered with the same operator as the base station, thereby avoiding synchronization and information transmission among the vehicle terminals registered with different operators. Therefore, the process is simplified.

Various embodiments of the present disclosure are described above in detail with reference to the accompanying drawings. It is provided according to the present disclosure a solution for reliably and rapidly acquiring communication resource, establishing synchronization and transmitting road safety information in a V2V communication system. The solution is especially suitable for a scenario where multiple operators coexist. That is, synchronization can be rapidly establish and road safety information can be transmitted among the vehicle terminals registered with different operators.

The base station described in the present disclosure may be realized as any type of evolved Node B (eNB) such as macro eNB and small eNB. The small eNB may be an eNB such as pico eNB, micro eNB and home (femto) eNB that covers a cell smaller than a macro cell. Instead, the base station may be realized as any other types of base stations such as NodeB and base transceiver station (BTS). In addition, various types of terminals described below may each operate as the base station by temporarily or semi-persistently implementing the function of a base station. The base station may include a main body (that is also referred to as base station device) configured to control radio communication, and one or more remote radio heads (RRH) provided separately from the main body.

The execution sequence of the steps described herein is merely illustrative and does not limit the order in which the processes or flows may be performed. Without affecting the implementation of the present disclosure, the execution sequence of the steps may be changed, or some steps may be performed in parallel with other steps. For example, steps S830 and S850 in FIG. 8 may be performed simultaneously, instead of being performed in the order as shown in the figure. This also applies to steps S860 and S870, and steps S880 and S890.

The various devices or modules described herein are only in the logical sense and do not strictly correspond to any physical devices or entities. For example, the function of each module described herein may be implemented by multiple physical entities, or the functions of multiple modules described herein may be implemented by a single physical entity. In addition, the features, components, elements, steps, and the like described in one embodiment are not limited to the embodiment, but may also be applied to other embodiments, for example, by replacing specific features, components, elements, and steps in the other embodiments or combining with the specific features, components, elements, and steps in the other embodiments.

The series of processes executed by each device or module in the above-described embodiments may be implemented by software, hardware, or a combination of the software and the hardware. Programs included in the software may be stored in advance in a storage medium provided inside or outside each device. As an example, during execution, these programs are written to a random access memory (RAM) and executed by a processor (for example, a CPU).

Figure 9:
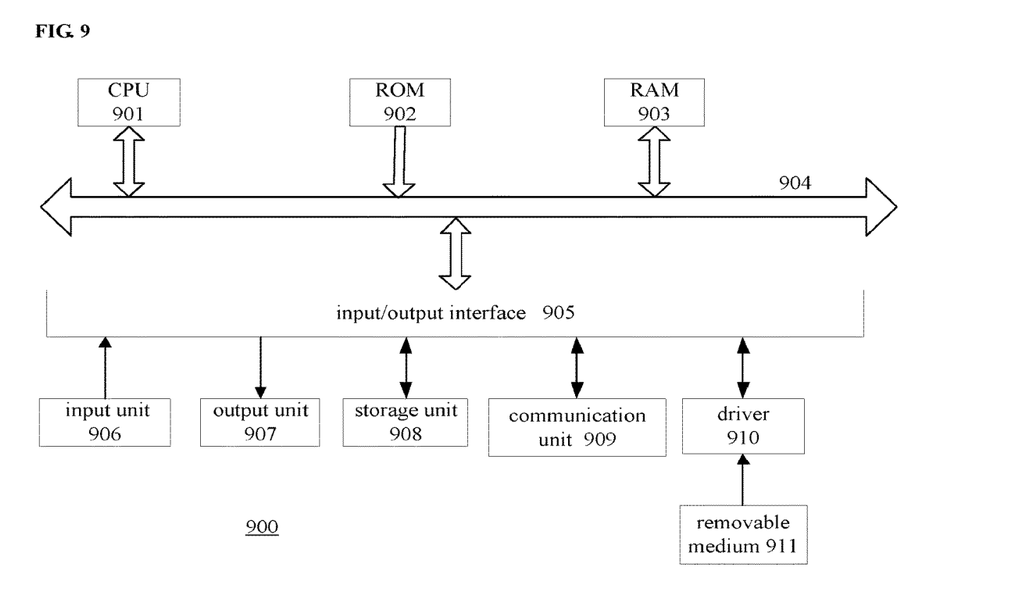
FIG. 9 is a block diagram showing an exemplary configuration of computer hardware.

FIG. 9 is a block diagram showing an exemplary configuration of computer hardware that executes the above-described processes according to a program.

In computer 900, central processing unit (CPU) 901, read only memory (ROM) 902, and random access memory (RAM) 903 are connected to each other by bus 904.

The input/output interface 905 is further connected to the bus 904. The input/output interface 905 is connected with the following components: input unit 906 including keyboard, mouse, microphone and the like; output unit 907 including display, speaker and the like; storage unit 908 including hard disk, nonvolatile memory and the like; communication unit 909 including network interface card (such as local area network (LAN) card, modem); and drive 910 driving removable medium 911 such as magnetic disk, optical disk, magneto-optical disk or semiconductor memory.

In the computer having the above configuration, the CPU 901 loads the program stored in the storage unit 908 into the RANI 903 via the input/output interface 905 and the bus 904 and executes the program, to execute the above-described processes.

A program to be executed by a computer (the CPU 901) may be recorded on the removable medium 911 which is a package medium including, for example, magnetic disk (including floppy disk), optical disk (including compact disk-read only memory (CD-ROM), digital versatile disk (DVD) and the like), magneto-optical disk or semiconductor memory. In addition, the program to be executed by the computer (the CPU 901) may also be provided via a wired or wireless transmission medium such as local area network, the internet or digital satellite broadcasting.

In a case where the removable medium 911 is installed in the drive 910, the program may be installed in the storage unit 908 via the input/output interface 905. In addition, the program may be received by the communication unit 909 via a wired or wireless transmission medium, and the program may be installed in the storage unit 908. Alternatively, the program may be installed in the ROM 902 or the storage unit 908 in advance.

The program to be executed by the computer may be a program that executes the processes in the order described in the present specification, or may be a program that executes the processes in parallel or executes the process when needed (such as when called).

The embodiments and the technical effects of the present disclosure are described in detail above with reference to the accompanying drawings, but the scope of the present disclosure is not limited thereto. It is to be understood by those skilled in the art that various modifications or changes can be made to the embodiments described herein without departing from the spirit and scope of the present disclosure depending on design requirements and other factors. The scope of the present disclosure is defined by the appended claims or their equivalents.

In addition, the present disclosure may also be configured as follows.

A node device for vehicle-to-vehicle communication, which includes one or more processors configured to: perform control, in response to road event-related information from a source device, to establish time synchronization with the source device; and generate synchronization information for transmission to one or more target devices, so that the target devices establish time synchronization with the source device based on the synchronization information, wherein the node device is a roadside unit or an onboard device capable of communication.

The one or more processors are further configured to perform control to establish time synchronization with the source device according to a global synchronization signal source.

The node device and the source device are registered with different operators, and the node device and the target device are registered with the same operator.

The one or more processors are further configured to: determine a priority of the road event based on the road event-related information; and determine a transmission period for the synchronization information based on the priority, wherein the higher the priority is, the shorter the transmission period is.

A resource for transmitting the synchronization information is prescribed and indicated to the node device and the target devices in advance. The synchronization information is transmitted by using a dedicated signaling.

A method for performing synchronization in a vehicle-to-vehicle communication system, which includes: establishing, by a node device, time synchronization with a source device, in response to road event-related information from the source device; transmitting, by the node device, synchronization information to one or more target devices; and establishing, by the target devices, time synchronization with the source device based on the received synchronization information, wherein the node device is a roadside unit or an onboard device capable of communication.

The node device establishes time synchronization with the source device according to a global synchronization signal source.

The node device and the source device are registered with different operators, and the node device and the target devices are registered with the same operator.

The method further includes: transmitting, by the source device, location information of the source device and the road event-related information to a serving base station of the source device; informing, by the serving base station of the source device, one or more neighbor base stations of the location information and the road event-related information; and selecting, by each of the serving base station and the one or more neighbor base stations, a communication devices which is located within its coverage and registered with the same operator as it is, as the node device, and transmitting, by each of the serving base station and the one or more neighbor base stations, the road event-related information to the selected node device, wherein the serving base station and the one or more neighbor base stations are registered with different operators.

The method further includes: each of the serving base station and the one or more neighbor base stations selects the node device within a predetermined distance from the source device in its coverage.

The node devices selected by the serving base station and by the neighbor base stations are registered with different operators.

The method further includes: establishing, by a specific target device among the one or more target devices, time synchronization with the source device based on synchronization information from another node device in a case where the specific target device is out of synchronization with the source device.

The method further includes: determining, by the target device, whether to establish a new synchronization based on quality and transmission period of new synchronization information upon receipt of the new synchronization information.

A device for vehicle-to-vehicle communication, which includes one or more processors configured to: generate a request message for requesting a base station to allocate a resource; perform control to establish time synchronization with a node device, such that at least one target devices establish time synchronization with the device based on synchronization information transmitted by the node device, wherein the node device is a roadside unit or an onboard device capable of communication; generate a control message for informing the at least one target devices of the resource allocated by the base station; and generate service information related to a service for transmission to the at least one target devices via the resource allocated by the base station.

The one or more processors are further configured to: generate a first request message for transmission to the base station, wherein the first request message is used for requesting the base station to allocate a resource for transmitting a second request message; and generate the second request message for transmission to the base station, wherein the second request message is used for requesting the base station to allocate a resource for transmitting the service information, wherein the control information is used for informing the at least one target devices of the resource for transmitting the service information.

The one or more processors are further configured to generate the second request message in a specific format, in a case where the base station simultaneously allocates the resource for transmitting the second request message and the resource for transmitting the service information in response to the first request information.

At least one of a service identifier and a group index in the second request message is fixed.

The one or more processors are further configured to determine, when transmitting the service information related to the service, whether to request the base station to allocate a resource for transmitting service information related to a new service based on a priority of the new service.

The one or more processors are further configured to generate a request message for requesting the base station to allocate a resource, in a case where the priority of the new service is higher than the priority of the service and the resource which has been allocated by the base station is insufficient to transmit the service information related to the new service.

The one or more processors are further configured to perform control to establish time synchronization with the node device according to a global synchronization signal source.

The node device and the device are registered with different operators, and the node device and the target devices are registered with the same operator.

The service information is road safety service information.

A method for transmitting service information in a vehicle-to-vehicle communication system, which includes: transmitting, by a source device, a request message to a base station, wherein the request message is used for requesting the base station to allocate a resource; transmitting, by a node device in synchronization with the source device, synchronization information to at least one target devices, such that the at least one target devices establish time synchronization with the source device based on the synchronization information, wherein the node device is a roadside unit or an onboard apparatus capable of communication; informing, by the source device, the at least one target devices of the resource allocated by the base station; and transmitting, by the source device, the service information to the at least one target devices by using the resource.

The step of transmitting the request message includes: transmitting a first request message, wherein the first request message is used for requesting the base station to allocate a resource for transmitting a second request message; transmitting the second request message by using the resource for transmitting the second request message allocated by the base station, wherein the second request message is used for requesting the base station to allocate a resource for transmitting the service information, wherein the source device informs the at least one target devices of the resource for transmitting the service information, so as to transmit the service information to the at least one target devices.

The method further includes: simultaneously allocating, by the base station, both the resource for transmitting the second request message and the resource for transmitting the service information to the source device, in response to the first request message.

The node device and the source device are registered with different operators, and the node device and the target devices are registered with the same operator.

A method for transmitting service information in a vehicle-to-vehicle communication system, wherein the vehicle-to-vehicle communication system includes multiple base stations, a controller for controlling the multiple base stations, a source device, and at least one target devices, and the method includes: acquiring, by the controller, location information and service information of the source device from a serving base station of the source device; transmitting, by the controller, the service information to all neighbor base stations within a predetermined range around the source device; and broadcasting, by each of the neighbor base stations, the service information to the target device within its coverage.

The multiple base stations are registered with different operators, and each of the neighbor base stations broadcasts the service information to the target device which is located within its coverage and registered with the same operator as it is.

Only the target device located within a predetermined distance from the source device receives the service information.

The invention claimed is:

1. A node device for vehicle-to-vehicle communication, comprising one or more processors configured to:

perform control, in response to road event-related information from a source device, to establish time synchronization with the source device;

generate synchronization information for transmission to one or more target devices, so that the target devices establish time synchronization with the source device based on the synchronization information;

determine a priority of a road event based on the road event-related information; and determine a transmission period for the synchronization information based on the priority, wherein the node device is a roadside unit or an onboard device capable of communication, and wherein the higher the priority is, the shorter the transmission period is.

2. The node device according to claim 1, wherein the one or more processors are further configured to perform control to establish time synchronization with the source device according to a global synchronization signal source.

3. The node device according to claim 1, wherein the node device and the source device are registered with different operators, and the node device and the target device are registered with the same operator.

4. The node device according to claim 1, wherein a resource for transmitting the synchronization information is prescribed and indicated to the node device and the target devices in advance.

5. The node device according to claim 1, wherein the synchronization information is transmitted by using a dedicated signaling.

6. The node device according to claim 1, wherein the time synchronization of the node with the source device is established based on a global navigation satellite system (GNSS) synchronization signal.

7. The node device according to claim 1, wherein the synchronization information comprises a sidelink synchronization signal (SLSS) and a master information block-sidelink (MIB-SL).

8. A method for performing synchronization in a vehicle-to-vehicle communication system, comprising:

establishing, by a node device, time synchronization with a source device, in response to road event-related information from the source device;

determining a priority of a road event based on the road event-related information;

determining a transmission period for synchronization information based on the priority;

transmitting, by the node device, the synchronization information to one or more target devices;

establishing, by the one or more target devices, time synchronization with the source device based on the received synchronization information and the determined transmission period, wherein the node device is a roadside unit or an onboard device capable of communication, and wherein the higher the priority is, the shorter the transmission period is.

9. The method according to claim 8, wherein the node device establishes time synchronization with the source device according to a global synchronization signal source.

10. The method according to claim 8, wherein the node device and the source device are registered with different operators, and the node device and the target devices are registered with the same operator.

11. The method according to claim 8, further comprising:

transmitting, by the source device, location information of the source device and the road event-related information to a serving base station of the source device;

informing, by the serving base station of the source device, one or more neighbor base stations of the location information and the road event-related information; and selecting, by each of the serving base station and the one or more neighbor base stations, a communication device as the node device, and transmitting, by each of the serving base station and the one or more neighbor base stations, the road event-related information to the selected node device.

12. The method according to claim 8, further comprising:

establishing, by a specific target device among the one or more target devices, time synchronization with the source device based on synchronization information from another node device in a case where the specific target device is out of synchronization with the source device.

13. The method according to claim 8, further comprising:

determining, by the target device, whether to establish a new synchronization based on quality and transmission period of new synchronization information upon receipt of the new synchronization information.

14. A device for vehicle-to-vehicle communication, comprising one or more processors configured to:

generate a request message for requesting a base station to allocate a resource;

determine a priority of a road event based on road event-related information;

determine a transmission period for synchronization information based on the priority, wherein the higher the priority is, the shorter the transmission period is;

perform control to establish time synchronization with a node device, such that at least one of a plurality of target devices establishes time synchronization with the device based on the synchronization information transmitted by the node device using the determined transmission period, wherein the node device is a roadside unit or an onboard device capable of communication;

generate a control message for informing the at least one of the plurality of target devices of the resource allocated by the base station; and generate service information related to a service for transmission to the at least one of the plurality of target devices via the resource allocated by the base station.

15. The device according to claim 14, wherein the one or more processors are further configured to:

generate a first request message for transmission to the base station, wherein the first request message is used for requesting the base station to allocate a resource for transmitting a second request message; and generate the second request message for transmission to the base station, wherein the second request message is used for requesting the base station to allocate a resource for transmitting the service information, wherein the control information is used for informing the at least one of the plurality of target devices of the resource for transmitting the service information.

16. The device according to claim 15, wherein the one or more processors are further configured to generate the second request message in a specific format, in a case where the base station simultaneously allocates the resource for transmitting the second request message and the resource for transmitting the service information in response to the first request information.

17. The device according to claim 15, wherein at least one of a service identifier and a group index in the second request message is fixed.

18. The device according to claim 14, wherein the one or more processors are further configured to determine, when transmitting the service information related to the service, whether to request the base station to allocate a resource for transmitting service information related to a new service based on a priority of the new service.

19. The device according to claim 18, wherein the one or more processors are further configured to generate a request message for requesting the base station to allocate a resource, in a case where the priority of the new service is higher than the priority of the service and the resource which has been allocated by the base station is insufficient to transmit the service information related to the new service.

20. The device according to claim 14, wherein the one or more processors are further configured to perform control to establish time synchronization with the node device according to a global synchronization signal source.

21. The device according to claim 14, wherein the service information is road safety service information.

* * * * *